(12) United States Patent
Kanzaki et al.

(10) Patent No.: US 9,378,649 B2
(45) Date of Patent: Jun. 28, 2016

(54) MASKING PARTIAL TEXT DATA IN DIGITAL DOCUMENT

(75) Inventors: Eisuke Kanzaki, Kanagawa-ken (JP); Yasutomo Nakayama, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1222 days.

(21) Appl. No.: 13/281,999

(22) Filed: Oct. 26, 2011

(65) Prior Publication Data

US 2012/0278709 A1    Nov. 1, 2012

(30) Foreign Application Priority Data

Nov. 12, 2010   (JP) .................... 2010-253817

(51) Int. Cl.
   *G09B 5/02*   (2006.01)
   *G09B 7/02*   (2006.01)

(52) U.S. Cl.
   CPC ...... *G09B 5/02* (2013.01); *G09B 7/02* (2013.01)

(58) Field of Classification Search
   None
   See application file for complete search history.

(56) References Cited

U.S. PATENT DOCUMENTS

| 5,038,316 A | 8/1991 | Hempleman et al. | |
| 8,352,876 B2* | 1/2013 | Batarseh et al. | 715/776 |
| 8,500,450 B1* | 8/2013 | Taylor et al. | 434/178 |
| 8,584,005 B1* | 11/2013 | Pittenger | G06F 17/24 715/230 |
| 2006/0242558 A1* | 10/2006 | Racovolis | G06F 17/241 715/205 |
| 2008/0181396 A1* | 7/2008 | Balakrishnan et al. | 380/28 |
| 2008/0239365 A1* | 10/2008 | Salgado et al. | 358/1.15 |
| 2009/0019379 A1* | 1/2009 | Pendergast et al. | 715/762 |
| 2011/0239113 A1* | 9/2011 | Hung et al. | 715/271 |

FOREIGN PATENT DOCUMENTS

| CN | 1573733 A | 2/2005 |
| JP | 06095583 A | 4/1994 |
| JP | 08329053 A | 12/1996 |
| JP | 11085742 A | 3/1999 |
| JP | 2002007420 A | 1/2002 |
| JP | 2002041012 A | 2/2002 |
| JP | 2002207725 A | 7/2002 |
| JP | 2003029612 A | 1/2003 |
| JP | 2003173129 A | 6/2003 |
| JP | 2006331329 A | 12/2006 |
| JP | 2007172404 A | 7/2007 |
| JP | 2009086203 A | 4/2009 |

* cited by examiner

*Primary Examiner* — Stephen Hong
*Assistant Examiner* — Sanchita Roy
(74) *Attorney, Agent, or Firm* — Cantor Colburn LLP

(57) ABSTRACT

Displaying digital document data with partial text data therein replaced with unreadable mask data. A designation is made of partial text data to be replaced within digital document data with the unreadable mask data. Replacement document data is generated. A selection of one of the plurality of rule information pieces is accepted. Then, based on the replacement information extracted by using a selection-accepted rule information piece, the unique identification information included in the replaced document data is replaced with either the unreadable mask data or the partial text data.

20 Claims, 18 Drawing Sheets

Figure 5

(a)    REGION (A)
          NAME: TARO YAMADA (b)    REGION (B)
          DATE: 1/1/2000

(c)    REGION (C)
          CARD NUMBER:
              1 2 3.  1 2 3.  1 2 3
              3 4 5.  3 4 5.  3 4 5
              5 6 7.  5 6 7.  5 6 7

Figure 6

REGION (A)   TARO YAMADA   →   T 0 0 0 1

REGION (B)   1/1/2000   →   T 0 0 0 2

REGION (C)   1 2 3. 1 2 3. 1 2 3   →   T 0 0 0 3
             3 4 5. 3 4 5. 3 4 5   →   T 0 0 0 4
             5 6 7. 5 6 7. 5 6 7   →   T 0 0 0 5

Figure 7

| NAME: T0001 | CARD NUMBER |
| | T0003 |
| TARO YAMADA WAS BORN ON T0002. | T0004 |
| | T0005 |

Figure 8

| REGION | ITEM NAME |
|--------|-----------|
| A | NAME |
| B | DATE |
| C | CARD NUMBER |
| ⋮ | ⋮ |

Figure 9

| NAME: ☐ ☐ ☐ ☐ | CARD NUMBER ☐ ☐ ☐ ☐ |
| TARO YAMADA WAS BORN ON ☐☐☐☐ | ☐ ☐ ☐ ☐ ☐ ☐ ☐ ☐ |

NAME:

□ □ □ □

CARD NUMBER

□ □ □

TARO YAMADA
WAS BORN ON
□□

| REGIO | ITEM NAME |
|---|---|
| A | NAME |

(b)

| REGIO | ITEM NAME |
|---|---|
| B | DATE |

(c)

| REGIO | ITEM NAME |
|---|---|
| C | CARD NUMBER |

| NAME: TARO YAMADA | CARD NUMBER ☐ ☐ ☐ ☐ |
| TARO YAMADA WAS BORN ON ☐☐☐☐ | ☐ ☐ ☐ ☐<br>☐ ☐ ☐ ☐ |

(b)

| NAME:<br>☐ ☐ ☐ ☐ | CARD NUMBER<br>☐ ☐ ☐ ☐ |
| TARO YAMADA WAS BORN ON 1/1/2000. | ☐ ☐ ☐ ☐<br>☐ ☐ ☐ ☐ |

MASKING PARTIAL TEXT DATA IN DIGITAL DOCUMENT

PRIORITY

This application claims priority to Japanese Patent Application No. 2010-253817, filed Nov. 12, 2010, and all the benefits accruing therefrom under 35 U.S.C. §119, the contents of which are herein incorporated by reference in its entirety.

BACKGROUND

The present invention relates to a method, an apparatus, a server, and a computer program product which are capable of masking any desired partial text data in an electronic or digital document and easily changing partial text data to be masked.

Increasingly, used digital books display digital document data on a personal computer display, in for example, a viewer. Newer digital books are designed to allow editing of currently shown digital document data by replacing only desired partial text data with mask data and by tagging the partial text data. See Japanese Patent Application Publication No. 2003-173129 as a patent literature.

In contrast, to enhance a rote learning effect, a study method using conventional nondigital books has been widely used. In this method, a word to be learned by heart in a book is marked with a marker pen or the like, and a transparent color sheet is placed on the page including the marked word for filtering to prevent the word from being read. For example, a word to be learned by heart is marked with a marker pen in red, green, or the like, and the page including the marked word is filtered by a transparent color sheet in green, red, or the like. This prevents the marked word from being read.

SUMMARY OF THE INVENTION

An embodiment includes a method of displaying digital document data with partial text data therein replaced with unreadable mask data. The method includes acquiring digital document data. A designation of partial text data to be replaced with the unreadable mask data is accepted. The partial text data is located within the digital document data. Replaced document data in which the partial text data in the digital document data is replaced with the associated unique identification information is generated. The plurality of rule information pieces are used to indicate a rule for replacing the unique identification information. A selection of one of the plurality of rule information pieces is accepted. Then, based on the replacement information extracted, by using a selection-accepted rule information piece, the unique identification information included in the replaced document data is replaced with either the unreadable mask data or the partial text data.

An additional embodiment includes an apparatus configured to display digital document data with partial text data therein replaced with unreadable mask data. The apparatus includes a data acquisition module that is configured to acquire the digital document data. The apparatus additionally includes a designation acceptance module that is configured to accept designation of the partial text data to be replaced with the unreadable mask data. The partial text data is located within the digital document data. The apparatus additionally includes a replaced document data generating module that is configured to generate replaced document data in which the partial text data in the digital document data is replaced with the associated unique identification information. The plurality of rule information pieces indicate a rule for replacing the unique identification information. The apparatus further includes a selection acceptance module that is configured to accept selection of one of the plurality of rule information pieces. The apparatus additionally includes a replacing module that is configured to replace, based on the replacement information extracted by using a selection-accepted rule information piece, the unique identification information included in the replaced document data with either the unreadable mask data or the partial text data.

A further embodiment includes a server configured to transmit digital document data with partial text data therein replaced with unreadable mask data to a client system. The server includes a partial text data receiver that is configured to receive the partial text data designated as a subject of replacement with the unreadable mask data in the digital document data. The server further includes a replaced document data generating module that is configured to generate replaced document data in which the partial text data in the digital document data is replaced with the unique identification information. The plurality of rule information pieces indicate a rule for replacing the unique identification information; a rule information receiver configured to receive a selection-accepted rule information piece; and a replacement information transmitter which is configured to send to a client computer the replaced document data and the replacement information. The replacement information is extracted by using the one of the plurality of rule information pieces as a key.

Yet another embodiment includes a computer program product executable by a server configured to replace partial text data included in digital document data with unreadable mask data. The computer program product includes a tangible storage medium readable by a processing circuit and storing instructions for execution by the processing circuit for performing a method. The method includes acquiring digital document data. A designation of partial text data to be replaced with the unreadable mask data is accepted. The partial text data is located within the digital document data. Replaced document data in which the partial text data in the digital document data is replaced with the associated unique identification information is generated. The plurality of rule information pieces are used to indicate a rule for replacing the unique identification information. A selection of one of the plurality of rule information pieces is accepted. Then, based on the replacement information extracted, by using a selection-accepted rule information piece, the unique identification information included in the replaced document data is replaced with either the unreadable mask data or the partial text data.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

FIGS. 5A to 5C depict how the digital document masking apparatus displays the acquired digital document data in respective regions according to an embodiment;

FIG. 6 depicts how the digital document masking apparatus assigns identification information to partial text data according to an embodiment;

FIG. 7 depicts replaced document data in the digital document masking apparatus according to an embodiment;

FIG. 8 depicts replacement information pieces corresponding to rule information pieces according to an embodiment;

FIG. 9 depicts the display after mask data replacement by the digital document masking apparatus 1 according to an embodiment;

FIG. 10 depicts how the digital document masking apparatus associates mask patterns stored in the mask pattern storage unit in an embodiment;

FIG. 11 depicts a display after mask data replacement by the digital document masking apparatus according to an embodiment;

FIGS. 13A to 13C depict replacement information pieces corresponding to rule information pieces stored in the replacement information storage unit of the digital document masking apparatus in an embodiment;

FIGS. 14A and 14B depict a display after mask data replacement by the digital document masking apparatus in an embodiment;

DETAILED DESCRIPTION

Figure 1:
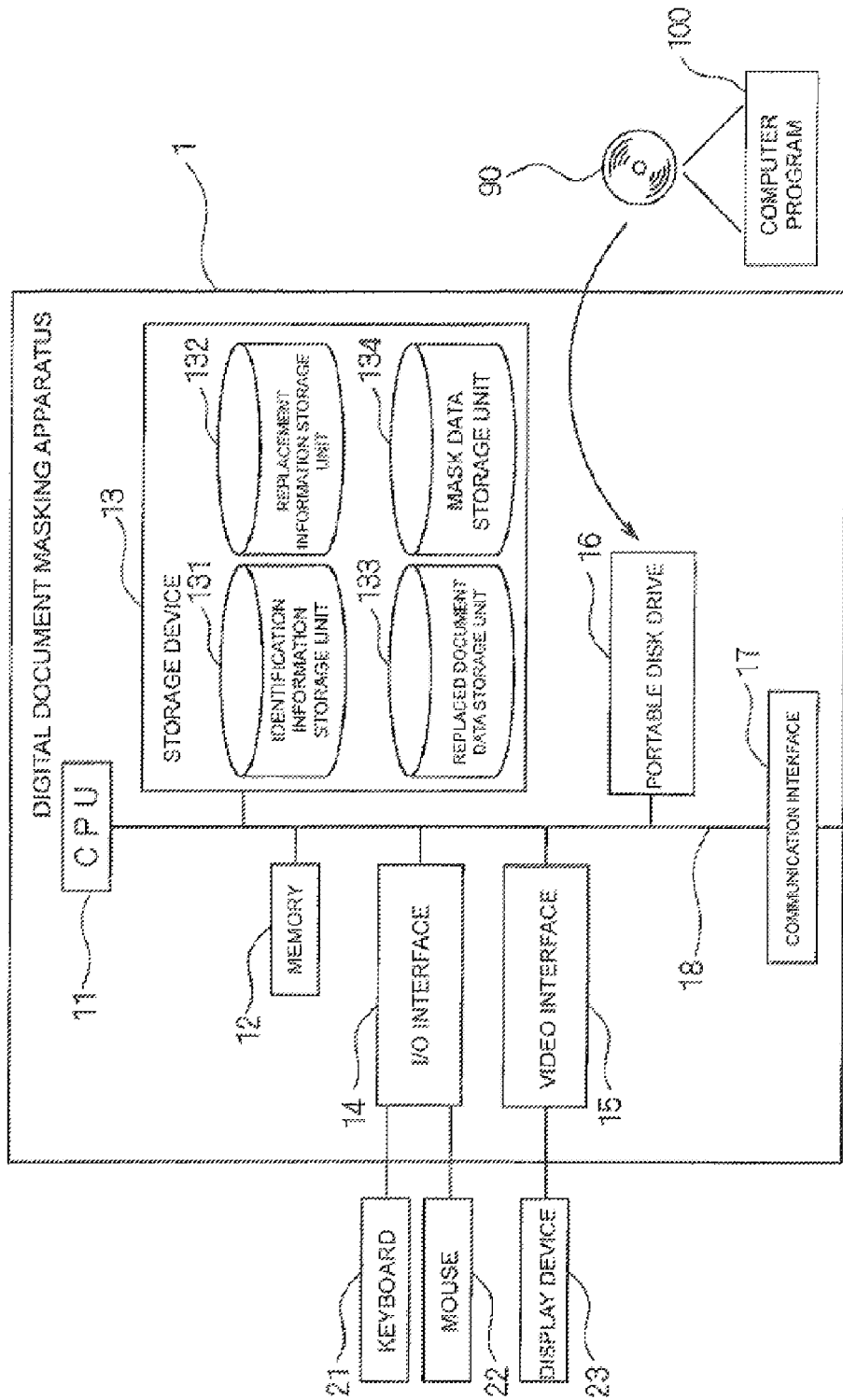
FIG. 1 is a schematic diagram that depicts a configuration of a digital document masking apparatus according to an embodiment.

Hereinafter, an apparatuses according to embodiments of the present invention configured to mask any desired text data in an electronic or digital document will be specifically described with reference to the drawings. The following embodiments do not limit the invention described in the scope of claims, and not all of combinations of features described in the embodiments are essential for the solving means.

In addition, the present invention may be carried out in various different modes and should not be understood only within the limits of the description of the embodiments. Within the figures, the same reference numbers are assigned to the same elements throughout the embodiments.

A description will be given below of an apparatus in which a computer program is installed in a computer system. However, as is obvious to those skilled in the art, a part of the present invention can be implemented as a computer program that can be executed on a computer. Accordingly, the present invention is feasible as an embodiment in hardware as an apparatus configured to mask any desired partial text data in an electronic or digital document, an embodiment as software, or an embodiment as a combination of software and hardware. The computer program may be recorded as computer instructions in any tangible computer-readable recording medium, such as a hard disk, a DVD, a CD, an optical storage device, and a magnetic storage device.

It is desirable to perform text data masking in digital books, however, once the partial text data is replaced with the mask data, the masked partial text data cannot be restored to the original data any more. Moreover, a digital book allows entire digital document data to be easily reloaded. Thus, once the entire digital document data is reloaded, the mask data is deleted in the newly reloaded digital document data.

In order to retain the mask data, even in the reloaded digital document data, the mask data needs to be written to the original digital document data. However, once the mask data is directly written to the original digital document data, the mask data is not changeable anymore in terms of its placement, color, etc. The digital books have that is different than the conventional paper books. To be more specific, once a mask is placed, the masked partial text data cannot overlap a mask with another mask in a different color, or the mask cannot be easily changed in range, i.e., made longer or shorter.

The present invention has been made in view of such circumstances. An object of the invention is to provide a method, an apparatus, a server, and a computer program which are capable of editing even electronic or digital document data by easily replacing desired partial text data with mask data and by easily and dynamically changing the position of partial text data to be replaced with mask data.

According to the embodiments of the present invention, any desired partial text data included in digital document data may be replaced with mask data on the basis of a selection-accepted rule information piece, or may be restored to original partial text data, and the partial text data is to be replaced with mask data is controlled by selecting the rule information piece to be applied. Moreover, no particular restriction is imposed on the length of the partial text data to be replaced with the mask data and on where the partial text data is to be masked. In addition, even a difference in length between the partial text data and the mask data does not cause an unnatural spacing.

FIG. 1 is a schematic diagram that depicts a configuration of a digital document masking apparatus according to an embodiment. A digital document masking apparatus 1 includes at least a central processing unit (CPU) 11, a memory 12, a storage device 13, an I/O interface 14, a video interface 15, a portable disk drive 16, a communication interface 17, and an internal bus 18 configured to connect the aforementioned hardware.

The CPU 11 is connected to such hardware units as described above of the digital document masking apparatus 1 via the internal bus 18. The CPU 11 controls operations of the aforementioned hardware units and executes various software functions according to a computer program 100 stored in the storage device 13. The memory 12 is formed by a volatile memory such as an SRAM or an SDRAM, and load modules are loaded on the memory 12 at the time of execution of the computer program 100. In addition, the memory 12 stores temporary data generated at the time of execution of the computer program 100.

The storage device 13 is formed of a built-in fixed storage device (a hard disk), ROM, etc. The computer program 100 stored in the storage device 13 is downloaded by the portable disk drive 16 from a portable recording medium 90 such as a DVD, a CD-ROM, etc., in which programs and information such as data are recorded. When being executed, the computer program 100 is loaded on the memory 12 from the storage device 13. The computer program 100 may be a computer program downloaded from an external computer connected via the communication interface 17.

The storage device 13 includes an identification information storage unit 131, a replacement information storage unit 132, a replaced document data storage unit 133, and a mask data storage unit 134. The identification information storage unit 131 stores therein designation-accepted partial text data and identification information associated therewith.

The replacement information storage unit 132 stores therein, for each rule information piece indicating a rule for replacing the identification information, replacement information indicating whether or not to replace the identification information with the mask data or the partial text data. The rule information piece represents information on any rule for selecting partial text data to be masked, for example, a rule for masking a year only, a telephone number only or the like.

The replaced document data storage unit 133 stores therein replaced document data in which designation-accepted partial text data in acquired digital document data is replaced with associated identification information. For example, by sending stored replaced document data to an external device, processing of replacing the identification information with the mask data or partial text data may be executed by an external computer. In addition, by combining replaced document data with replacement information, digital document data subjected to any masking is generated.

The mask data storage unit 134 stores therein information on a pattern (a mask pattern) of the mask data used for replacing identification information included in replaced document data. The pattern information is not limited. As long as replaced partial text data cannot be read from a pattern, any pattern may be used, such as, for example, a rectangular solid pattern in any color or a hatched pattern.

The communication interface 17 is connected to the internal bus 18. The communication interface 17 is also connected to an external network such as the Internet, a LAN or a WAN, and the connection enables data exchange with an external computer or the like.

The I/O interface 14 is connected to data input media such as a keyboard 21 and a mouse 22 to accept data input. The video interface 15 is connected to a display device 23 such as a CRT monitor or an LCD to display certain digital document data.

Figure 2:
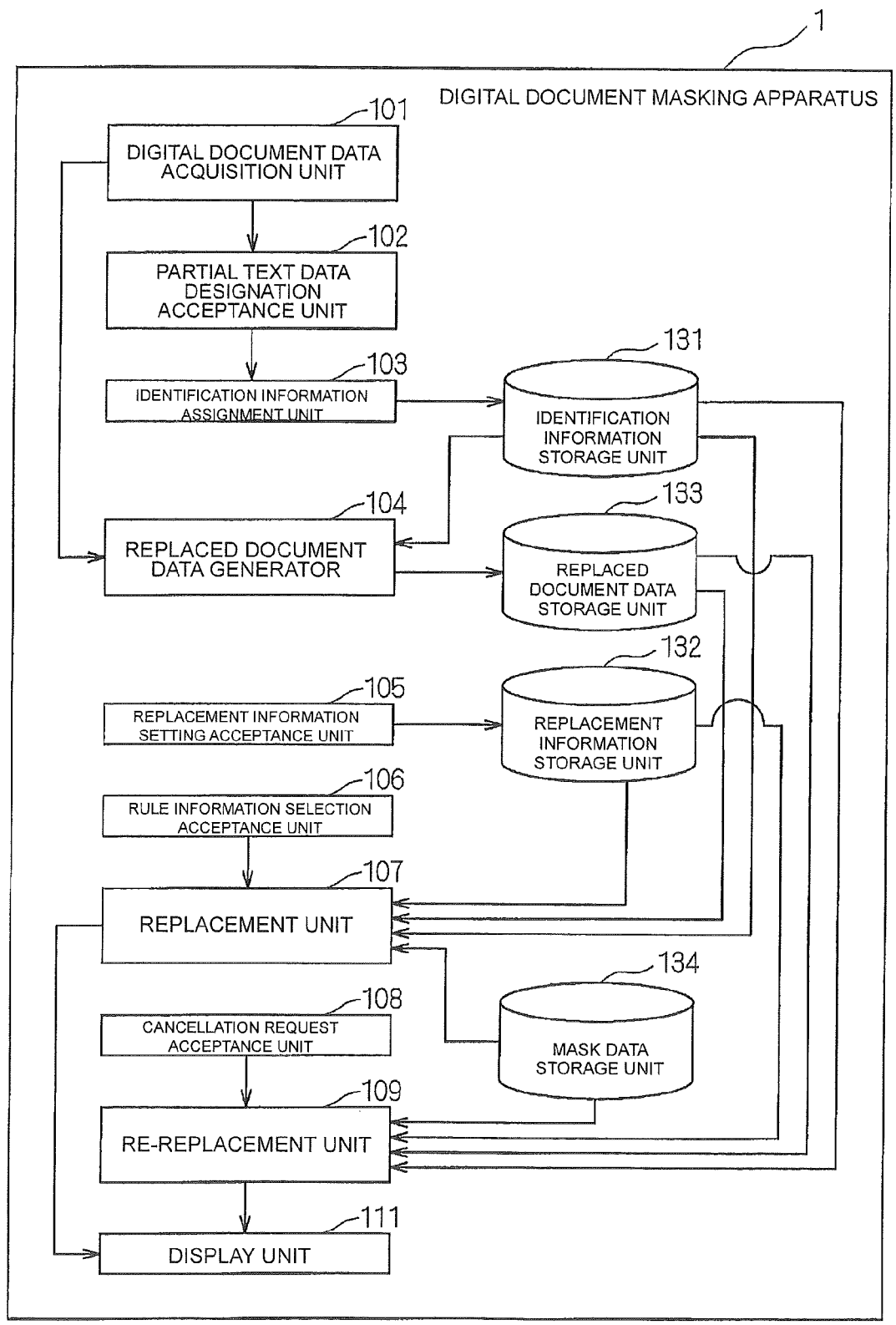
FIG. 2 is a process flow performed by the digital document masking apparatus in an embodiment.

Hereinafter, a description is given of an operation of the digital document masking apparatus 1 having the aforementioned configuration. FIG. 2 is a process flow performed by the digital document masking apparatus 1 according to an embodiment of the present invention.

In FIG. 2, a digital document data acquisition unit 101 of the digital document masking apparatus 1 acquires digital document data on which masking is to be performed. The digital document data may be acquired by any means known in the art. The digital document data may be acquired as text data or may be acquired as image data from which text data is extracted.

A partial text data designation acceptance unit (designation accepting means) 102 accepts designation of partial text data to be replaced with the mask data in the acquired digital document data. In an embodiment, the partial text data is a word based on a part of speech or having combined consecutive parts of speech, the word is obtained by executing a morphological analysis or the like on the digital document data, which is text data.

An identification information assignment unit (identification information storing means) 103 assigns unique identification information, for example, an identification ID to designation-accepted partial text data and stores the identification information in the identification information storage unit 131 of the storage device 13. The assignment of the identification information may be performed by the CPU 11 automatically or by accepting designation of the user.

A replaced document data generator (replaced document data generating means) 104 generates replaced document data in which designation-accepted partial text data in the acquired digital document data is replaced with assigned identification information. The generated replaced document data is stored in the replaced document data storage unit 133 of the storage device 13.

A replacement information setting acceptance unit (replacement information storing means) 105 accepts and stores therein replacement information indicating whether or not to replace the identification information with the mask data or partial text data for each rule information piece, each of the rule information pieces are for identifying a rule for replacing designation-accepted partial text data with mask data. The rule information piece represents information on any rule for selecting partial text data to be masked, for example, a rule for masking a year only, a telephone number only, etc. The rule information piece is set in advance with the keyboard 21, the mouse 22, etc., by the user and stored in the storage device 13.

The replacement information is stored as an item name of the partial text data to be replaced with the mask data. In other words, the item name of the partial text data to be replaced is set by using the keyboard 21, the mouse 22, etc. Any data does not have an item name set is not replaced with the mask data. The set item name is stored as the replacement information in the replacement information storage unit 132 of the storage device 13.

A rule information selection acceptance unit (selection accepting means) 106 accepts selection of a rule information piece. A replacement unit (replacing means) 107 replaces the identification information included in the replaced document data with the mask data or partial text data based on the replacement information extracted from the replacement information storage unit 132 by using the selection-accepted rule information piece as data key, the identification information, the replaced document data and the mask data. A mask pattern stored in the mask data storage unit 134 is used to determine a pattern of the mask data for the replacement. A display unit 111 displays the replaced digital document data on the display device 23. The digital document data may be stored in the storage device 13.

Acceptance of a rule information piece by the rule information selection acceptance unit 106 is not limited to acceptance of the selection of a single rule information piece. The rule information selection acceptance unit 106 may accept selection of multiple rule information pieces. In the case of acceptance of the selection of multiple rule information pieces, the replacement unit 107 replaces identification information pieces included in the replaced document data with respective mask data pieces or partial text data pieces based on the respective multiple rule information pieces. If even one rule for replacing the partial text data with the mask data is included in the selection-accepted rule information pieces, the partial text data is replaced with the mask data. Accordingly, partial text data to be masked can be freely selected according to the selection of the rule information piece.

Figure 3:
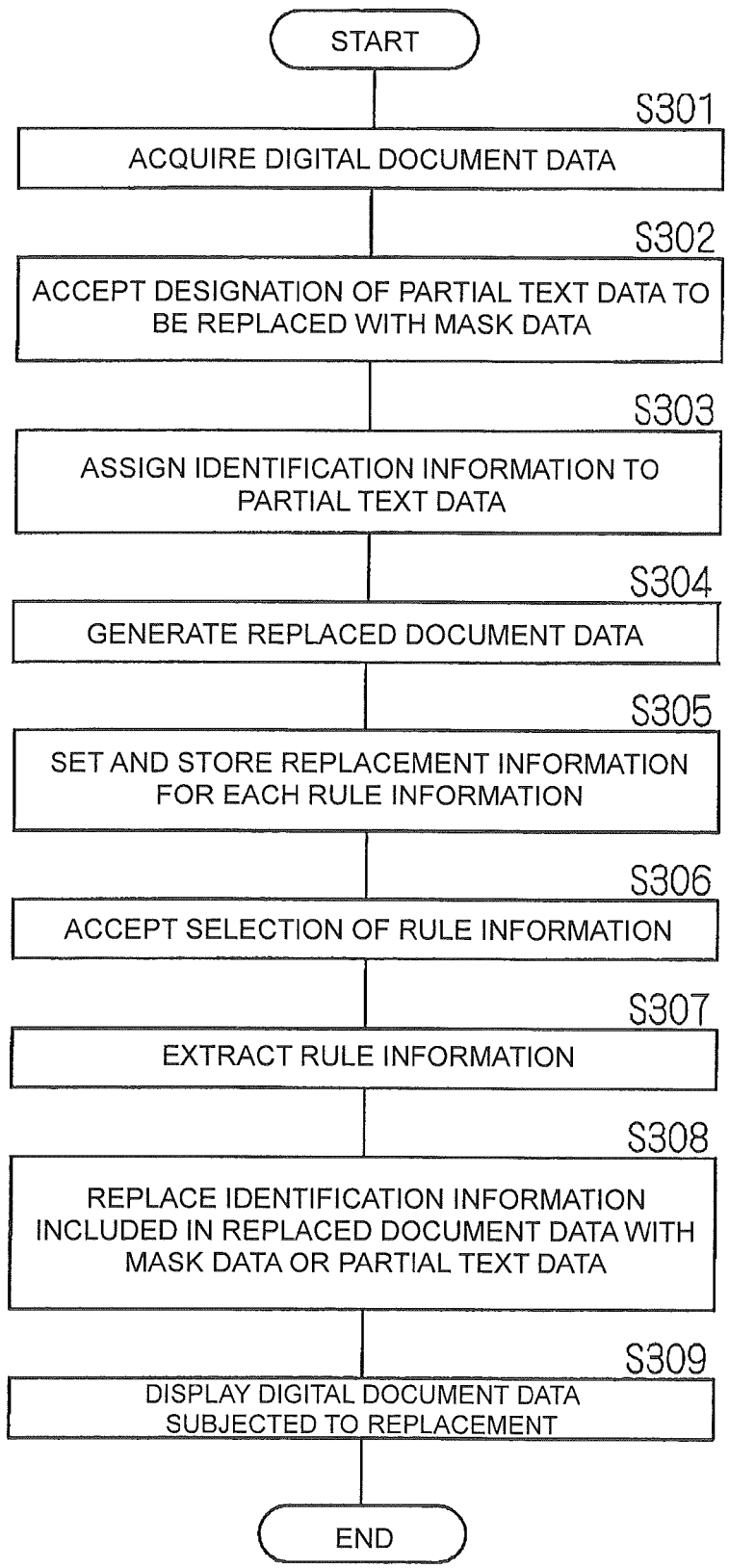
FIG. 3 is a process flow depicting the processing procedures of the CPU 11 of the digital document masking apparatus according to an embodiment.

FIG. 3 is a process flow depicting the processing procedures of the CPU 11 of the digital document masking apparatus 1 according to an embodiment. At block S301 the CPU 11 of the digital document masking apparatus 1 acquires digital document data on which masking is to be performed. The digital document data may be acquired by any means known in the art. The digital document data may be acquired as text data or may be acquired as image data from which text data is extracted.

At block S302, the CPU 11 accepts designation of partial text data to be replaced with the mask data in the acquired digital document data. The partial text data is a word based on a part of speech or having combined consecutive parts of speech, the word is obtained by executing a morphological analysis or the like on the digital document data which is text data.

At block S303, the CPU 11 assigns unique identification information, for example, an identification ID to designation-accepted partial text data and stores the identification information in the identification information storage unit 131 of the storage device 13. In an embodiment, the assignment of the identification information is performed by the CPU 11 automatically. In an additional embodiment, the assignment of the identification information is performed by designation of the user.

At block S304, the CPU 11 generates replaced document data in which partial text data in the acquired digital document data is replaced with assigned identification information. The generated replaced document data is stored in the replaced document data storage unit 133 of the storage device 13.

At block S305, for each rule information piece, the CPU 11 sets and stores, replacement information indicating whether or not to replace the identification information with the mask data or the partial text data. The rule information piece is provided to identify a rule for replacing designation-accepted partial text data with the mask data. The rule information piece is set with the keyboard 21, the mouse 22 or the like by the user and stored in the storage device 13 in advance.

At block 306, the CPU 11 accepts selection of a rule information piece, fetches replacement information from the replacement information storage unit 132. At block S307, the selection-accepted rule information piece is extracted and used as a data key. At block S308, identification information included in the replaced document data is replaced with the mask data or the partial text data on the basis of the extracted replacement information, the identification information, the replaced document data, and the mask data. A mask pattern stored in the mask data storage unit 134 is used to determine a pattern of the mask data for the replacement. At block S309, the CPU 11 displays the digital document data in which the identification information is replaced with the mask data or the partial text data on the display device 23.

Note that in accepting selection of the rule information piece, it is preferable to accept a cancellation request made by the user because the acceptance of the cancellation enables stepwise adjustment of partial text data to be masked. For example, a cancellation request acceptance unit 108 in FIG. 2 accepts a cancellation request which is a request for cancelling application of a rule information piece. Specifically, the cancellation request acceptance unit 108 accepts, through the keyboard 21, the mouse 22 or the like, selection of the rule information piece application of which should be cancelled among already selected rule information pieces.

Figure 4:
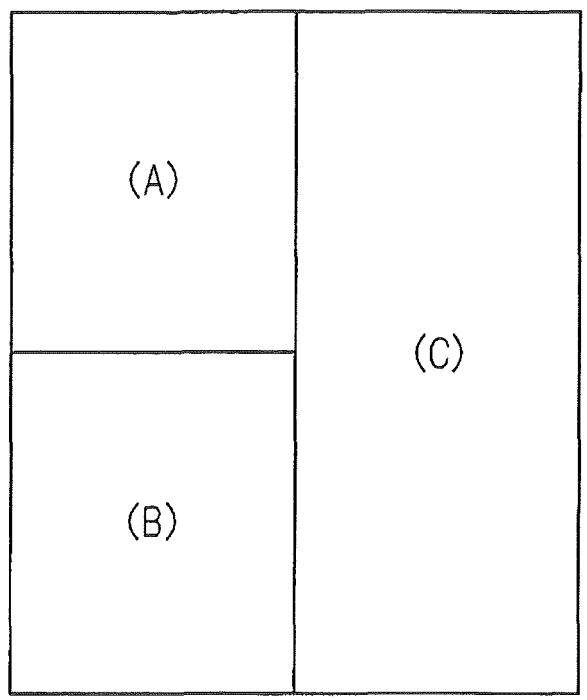
FIG. 4 depicts a layout of digital document data acquired by the digital document masking apparatus according to an embodiment.

FIG. 4 depicts a layout of digital document data acquired by the digital document masking apparatus 1 according to an embodiment. In an embodiment of the layout of the acquired digital document data, the digital document data is divided into three regions, i.e., a region (A), a region (B), and a region (C).

FIGS. 5A to 5C depict how the digital document masking apparatus 1 displays the acquired digital document data in respective regions according to an embodiment. As shown in FIGS. 5A to 5C, the region (A) displays "Taro Yamada" as "Name" which is an item name. The region (B) displays "Jan. 1, 2000" as "Date" which is an item name. The region (C) displays "123.123.123", "345.345.345", and "567.567.567" as "Card Number" which is an item name.

FIG. 6 depicts how the digital document masking apparatus 1 assigns identification information to partial text data according to an embodiment. As shown in FIG. 6, "T0001" and "T0002" are assigned as identification IDs (identification information) to "Taro Yamada" in the region (A) and "Jan. 1, 2000" in the region (B), respectively. In addition, "T0003", "T0004", and "T0005" are assigned as identification IDs to "123.123.123", "345.345.345", and "567.567.567" in the region (C), respectively.

FIG. 7 depicts replaced document data in the digital document masking apparatus 1 according to an embodiment. As shown in FIG. 7, "Taro Yamada" in the region (A) and "Jan. 1, 2000" in the region (B) are replaced with the identification IDs "T0001" and "T0002," respectively. In addition, "123.123.123", "345.345.345", and "567.567.567" in the region (C) are replaced with the identification IDs "T0003", "T0004", and "T0005", respectively. By designating which one of the mask data and partial text data is used to replace the identification IDs which are replacement information, where the mask is applied may be easily and dynamically changed.

In an embodiment, item names used for replacement with the mask data are stored as replacement information for each rule information piece. FIG. 8 depicts replacement information pieces corresponding to rule information pieces stored in the replacement information storage unit 132 of the digital document masking apparatus 1 according to an embodiment. As shown in FIG. 8, the item names used for the replacement with the mask data are stored on a region basis. In an embodiment, only the regions may be designated and stored without the item names. When storing the regions it is possible to set all the partial text data included in the regions as replacement subjects.

For the mask data, a mask pattern is designated in advance. For item names stored as replacement information in the replacement information storage unit 132, identification IDs are replaced with the mask data. For item names not stored as replacement information in the replacement information storage unit 132, identification IDs are replaced with the partial text data. FIG. 9 depicts the display after mask data replacement by the digital document masking apparatus 1 according to an embodiment.

In an example in FIG. 9, the mask pattern is set as a four-character "☐" string. Thus, for the item names stored as replacement information shown in FIG. 8, the mask data which is the four-character "☐" string is displayed in place of the identification IDs thereof.

Figure 10:
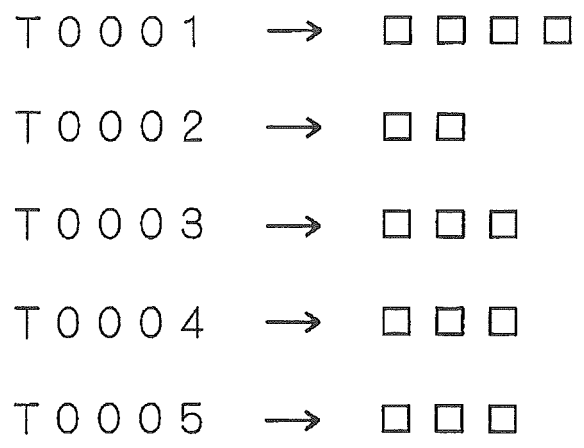

In an embodiment, the mask pattern of the mask data may be changed depending on the item. In this case, mask patterns used for the replacement are stored in the mask data storage unit 134 of the storage device 13 in association with the identification IDs. FIG. 10 depicts how the digital document masking apparatus 1 associates mask patterns stored in the mask pattern storage unit 134 in an embodiment.

As shown in FIG. 10, the identification ID "T0001" is associated with the four-character "☐" string as the mask pattern, while the identification ID "T0002" is associated with a two-character "☐" string as the mask pattern. The identification IDs "T0003", "T0004", and "T0005" are associated with a three-character "☐" string as the mask pattern.

As described above, in an embodiment, the mask patterns are stored in association with the identification IDs, and therefore, the identification IDs may be replaced with desired mask data for the item names stored as replacement information. FIG. 11 depicts a display after mask data replacement by the digital document masking apparatus 1 according to an embodiment.

In an embodiment, for the item names stored as the replacement information shown in FIG. 8, the mask patterns shown in FIG. 10 is displayed in place of the identification IDs thereof.

The replacement information may be stored for each rule information piece. Thus, when multiple rule information pieces are stored, selection of one of the rule information pieces to be applied allows only a desired item to be displayed with the identification ID thereof replaced with the mask data.

When the cancellation request acceptance unit 108 accepts a cancellation request, a re-replacement unit 109 in FIG. 2 replaces an identification ID included in the replaced document data, based on the replacement information extracted by using rule information pieces, except for the rule information piece corresponding to the cancellation request, identification information, replaced document data, and the mask data. The display unit 111 displays the digital document data replaced by the re-replacement unit 109 on the display device 23. In an embodiment, the digital document data may be stored in the storage device 13.

Figure 12:
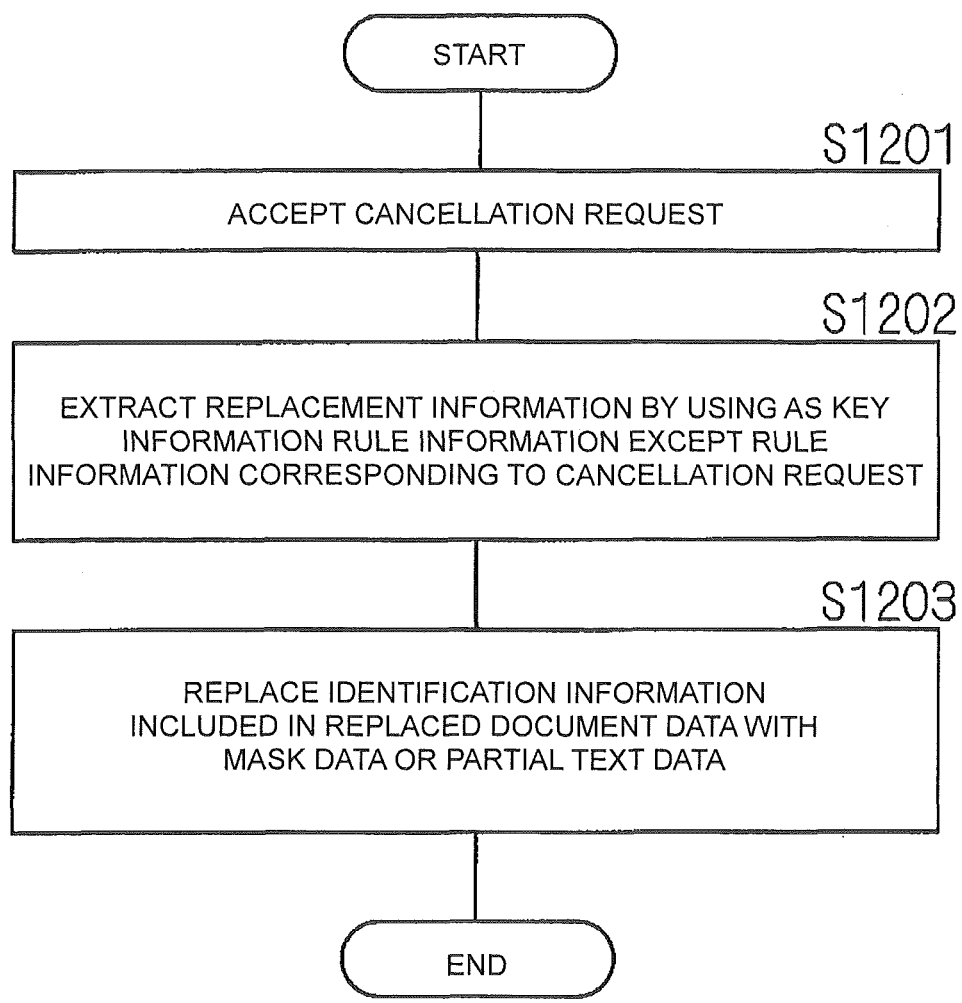
FIG. 12 depicts a process flow for the processing procedures of the CPU of the digital document masking apparatus in an embodiment.

FIG. 12 depicts a process flow for the processing procedures of the CPU 11 of the digital document masking apparatus 1 in an embodiment. At block S1201, the CPU 11 of the digital document masking apparatus 1 accepts a cancellation request, which is a request for cancelling application of a rule information piece. Specifically, the CPU 11 accepts selection of the rule information piece, the application of which should be cancelled in the already selected rule information pieces, through the keyboard 21, the mouse 22, etc.

At block S1202, the CPU 11 fetches replacement information by using, as a data key, the rule information pieces except for the rule information piece corresponding to the accepted cancellation request. At block S1203, the CPU 11 replaces the identification information included in the replaced document data with the mask data or partial text data based on the extracted replacement information, the identification information, the replaced document data, and the mask data. By determining whether or not to apply each rule information piece, the sections of text that are to be replaced with the mask data are controlled. The overall processing performance can be enhanced in the following manner. Instead of at block S1202, in an embodiment, all of the rule information pieces are extracted in advance, when the first replacement information is extracted. Subsequently, upon acceptance of a cancellation request, the extracted replacement information is selected for the cancellation request.

FIGS. 13A to 13C depict replacement information pieces corresponding to rule information pieces stored in the replacement information storage unit 132 of the digital document masking apparatus 1 in an embodiment. In the embodiment of FIGS. 13A to 13C, three replacement information pieces in FIGS. 13A to 13C are stored.

FIGS. 14A and 14B depict a display after mask data replacement by the digital document masking apparatus 1 in an embodiment. In the embodiment of FIGS. 14A and 14B the mask pattern of the four-character "□" string.

In an embodiment, when the replacement information pieces in FIGS. 13A to 13C are extracted for multiple rule information pieces, the mask data, i.e., the four "□" strings, as shown in FIG. 9 are displayed in place of the identification IDs thereof. In contrast, when a cancellation request for cancelling the application of the rule information piece corresponding to the replacement information piece in FIG. 13A is accepted, the identification ID "T0001" in the region (A) is replaced with partial text data "Taro Yamada," as displayed in FIG. 14A.

When a cancellation request for cancelling the application of the rule information piece corresponding to the replacement information piece in FIG. 13B is accepted, the identification ID "T0002" of the region (B) is replaced with partial text data "Jan. 1, 2000," as displayed in FIG. 14B. As described above, partial text data that is to be masked can be freely selected according to the selection of the rule information piece.

According to an embodiment, as described above, based on a selection-accepted rule information piece, any desired partial text data included in digital document data may be replaced with the mask data or restored to the original partial text data. In addition, the data that is to be replaced with the mask data may be controlled by selecting a rule information piece to be applied thereto. Moreover, there is no restriction on the length of the partial text data to be masked with the mask data and on where that data is to be masked. In addition, even a difference in length between the partial text data and the mask data does not cause an unnatural spacing.

Figure 15:
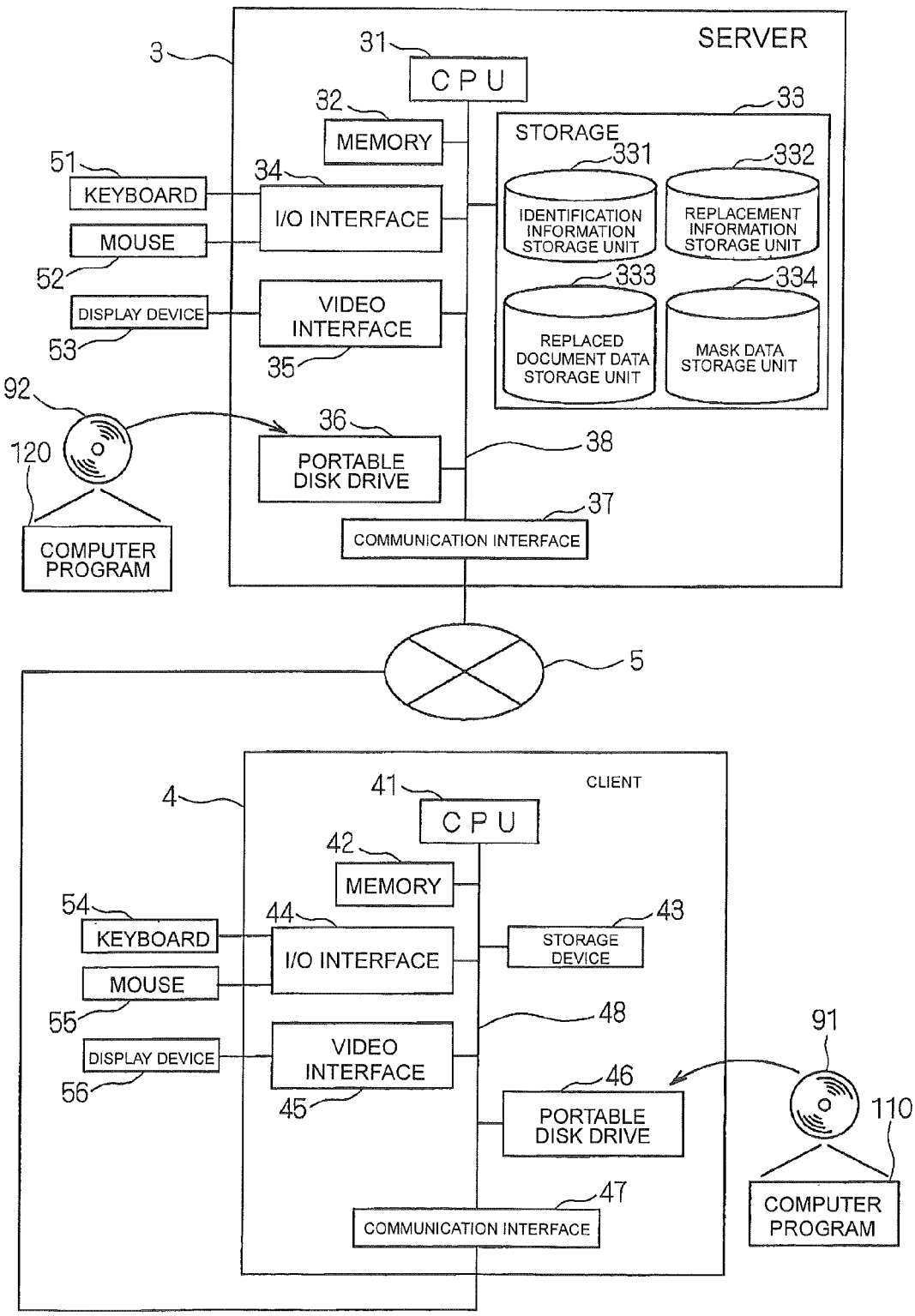
FIG. 15 depicts a schematic diagram depicting a configuration of a digital document masking apparatus in an embodiment.

FIG. 15 is a schematic diagram depicting a configuration of a digital document masking apparatus according to an additional embodiment of the present invention. A digital document masking system according to FIG. 2 includes: a client 4 configured to execute input and output data, and a server 3 connected to and in communication with the client 4 via a network 5. The server 3 of the digital document masking system includes at least a CPU 31, a memory 32, a storage device 33, an I/O interface 34, a video interface 35, a portable disk drive 36, a communication interface 37, and an internal bus 38 configured to connect the aforementioned hardware.

The CPU 31 is connected to such hardware units as described above of the server 3 via the internal bus 38. The CPU 31 controls operations of the aforementioned hardware units and executes various software functions according to a computer program 120 stored in the storage device 33. The memory 32 is formed by a volatile memory such as an SRAM or an SDRAM, and load modules are loaded on the memory 32 at the time of execution of the computer program 120. In addition, the memory 32 stores temporary data and the like generated at the time of execution of the computer program 120.

The storage device 33 is formed of a built-in fixed storage device (a hard disk), ROM or the like. The computer program 120 stored in the storage device 33 is downloaded by the portable disk drive 36 from a portable recording medium 92 such as a DVD, a CD-ROM or the like in which programs and information such as data are recorded. When being executed, the computer program 120 is loaded on the memory 32 from the storage device 33. The computer program 120 may be a computer program downloaded from an external computer connected via the communication interface 37.

The storage device 33 includes an identification information storage unit 331, a replacement information storage unit 332, a replaced document data storage unit 333, and a mask data storage unit 334. The identification information storage unit 331 receives and stores therein partial text data designation of which is accepted in the client 4 and identification information associated therewith.

The replacement information storage unit 332 stores therein, for each rule information piece indicating a rule for replacing the identification information of the accepted designation, replacement information indicating whether or not to replace the identification information included in the generated replaced document data with the mask data or the partial text data. The rule information piece represents information on any rule for selecting partial text data to be masked, for example, a rule for masking a year only, a telephone number, etc.

The replaced document data storage unit 333 stores therein replaced document data in which designation-accepted partial text data in acquired digital document data is replaced with associated identification information. By sending stored replaced document data to the client 4, processing of replacing the identification information with the mask data or partial text data may be executed by the client 4. In addition, by combining replaced document data with replacement information, digital document data subjected to desired masking may be generated.

The mask data storage unit 334 stores therein information on a pattern of the mask data used for replacing identification information included in the replaced document data. As long as the replaced partial text data cannot be read from a pattern, any pattern may be used, such as a rectangular solid pattern in any color or a hatched pattern.

The communication interface 37 is connected to the internal bus 38. The communication interface 37 is also connected to an external network 5 such as the Internet, a LAN or a WAN, and the connection enables data exchange with the client 4, an external computer or the like.

The I/O interface 34 is connected to data input media such as a keyboard 51 and a mouse 52 to accept data input. The video interface 35 is connected to a display device 53 such as a CRT monitor or an LCD to display certain digital document data.

The client 4 of the digital document masking apparatus according to Embodiment 2 of the present invention includes at least a CPU 41, a memory 42, a storage device 43, an I/O interface 44, a video interface 45, a portable disk drive 46, a communication interface 47, and an internal bus 48 configured to connect the aforementioned hardware.

The CPU 41 is connected to such hardware units as described above of the client 4 via the internal bus 48. The CPU 41 controls operations of the aforementioned hardware units and executes various software functions according to a computer program 110 stored in the storage device 43. The memory 42 is formed by a volatile memory such as an SRAM or an SDRAM, and load modules are loaded on the memory 42 at the time of execution of the computer program 110. In addition, the memory 42 stores temporary data and the like generated at the time of execution of the computer program 110.

The storage device 43 is formed of a built-in fixed storage device (a hard disk), ROM or the like. The computer program 110 stored in the storage device 43 is downloaded by the portable disk drive 46 from a portable recording medium 91 such as a DVD, a CD-ROM or the like in which programs and information such as data are recorded. When being executed, the computer program 110 is loaded on the memory 42 from the storage device 43. The computer program 110 may be a computer program downloaded from an external computer connected via the communication interface 47.

The communication interface 47 is connected to the internal bus 48. The communication interface 47 is also connected to the external network 5 such as the Internet, a LAN or a WAN, and the connection enables data exchange with an external computer or the like.

The I/O interface 44 is connected to data input media such as a keyboard 54 and a mouse 55 to accept data input. The video interface 45 is connected to a display device 56 such as a CRT monitor or an LCD to display certain digital document data.

Figure 16:
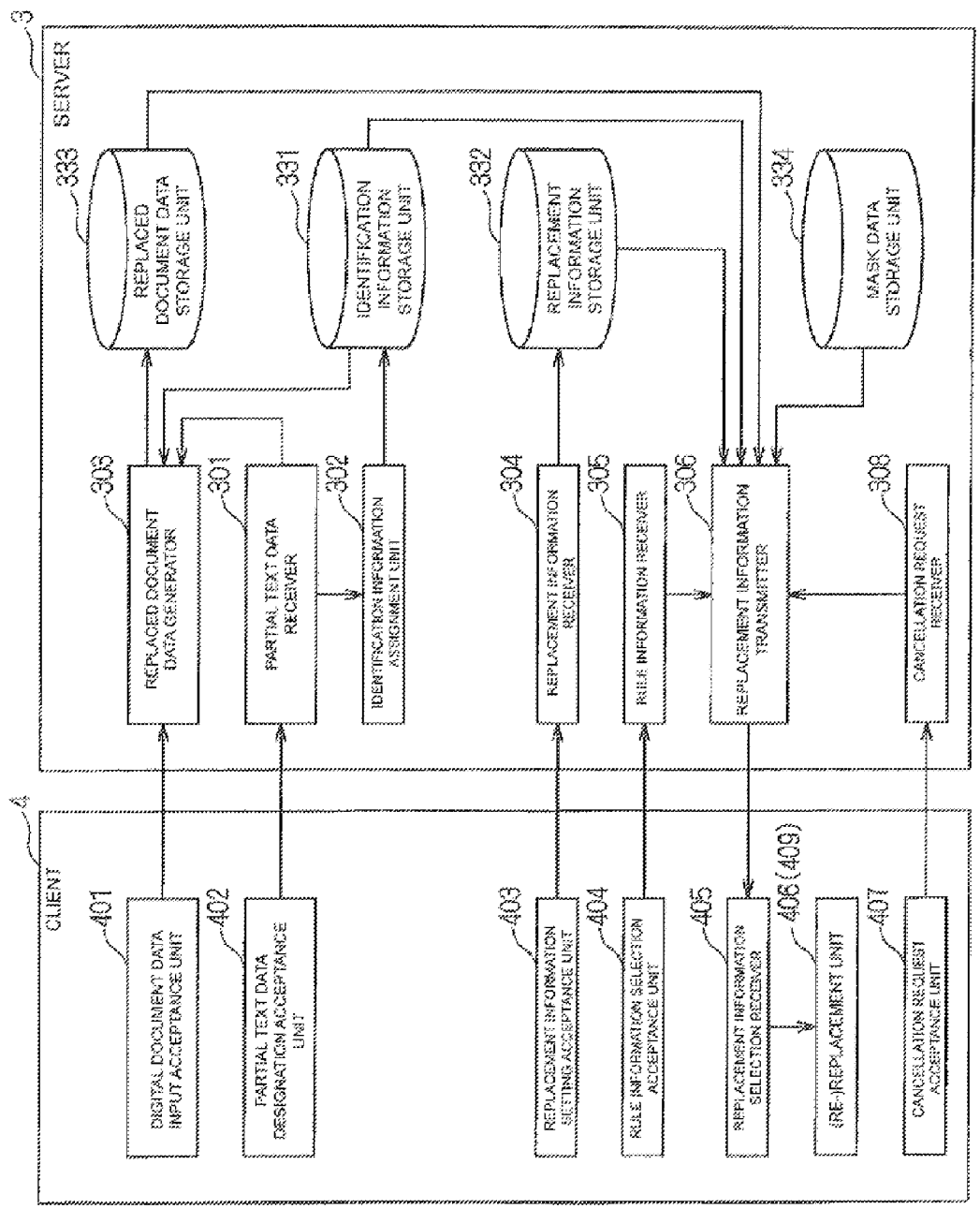
FIG. 16 depicts a process flow of the digital document masking apparatus in an embodiment.

Hereinafter, a description is given of an operation of the digital document masking system having the aforementioned configuration. FIG. 16 depicts a process flow of the digital document masking apparatus according to an embodiment.

In FIG. 16, a digital document data input acceptance unit (data input accepting means) 401 of the client 4 of the digital document masking system accepts input of digital document data on which masking is to be performed and sends the digital document data to the server 3. The digital document data may be acquired using any method known in the art. The digital document data may be directly accepted as text data or accepted as image data from which text data is extracted.

A partial text data designation acceptance unit (designation accepting means) 402 accepts designation of partial text data to be replaced with the mask data in the digital document data of the accepted input and sends the partial text data to the server 3. The partial text data is a word based on a part of speech or having combined consecutive parts of speech, the word is obtained by executing a morphological analysis or the like on the digital document data which is text data.

A partial text data receiver 301 of the server 3 receives the partial text data of which the designation is accepted in the client 4 and an identification information assignment unit (identification information storing means) 302 assigns unique identification information, for example, an identification ID to the received partial text data and stores the identification information in the identification information storage unit 331 of the storage device 33. The assignment of the identification information may be performed by the CPU 31 automatically or by the user.

A replaced document data generator 303 of the server 3 generates replaced document data in which partial text data in the received digital document data is replaced with assigned identification information. The generated replaced document data is stored in the replaced document data storage unit 333 of the storage device 33.

A replacement information setting acceptance unit 403 of the client 4 accepts, for each rule information piece indicating a rule for replacing the identification information, setting of replacement information indicating whether or not to replace the identification information with the mask data or the partial text data, and sends the setting to the server 3. The rule information piece is provided to identify a rule for replacing designation-accepted partial text data with mask data. The rule information piece represents information on any rule for selecting partial text data to be masked, for example, a rule for masking a year only, a telephone number only, etc. The rule information piece is set in advance with a keyboard 54, a mouse 55, etc., by the user and is sent to the server 3 to be stored in the storage device 33.

The replacement information is stored as an item name of partial text data to be replaced with the mask data. In other words, the item name of the partial text data to be replaced is set by using the keyboard 54, the mouse 55, etc. Data that does not have an item name is not replaced with the mask data. The set item name is sent to the server 3. A replacement information receiver 304 of the server 3 receives the replacement information of which the setting is accepted by the client 4 and stores the replacement information in the replacement information storage unit 332 of the storage device 33.

A rule information selection acceptance unit (selection accepting means) 404 accepts selection of a rule information piece and sends the selection-accepted rule information piece to the server 3. A rule information receiver 305 receives the selection-accepted rule information piece from the client 4. A replacement information transmitter 306 sends to the client 4 the replacement information extracted by using the received rule information piece as a data key, the identification information, the replaced document data, and the mask data.

A replacement information receiver 405 receives the replacement information, the identification information, the replaced document data, and the mask data and replaces the identification information included in the replaced document data with the mask data or partial text data on the basis of these received data. A mask pattern stored in a mask data storage unit 334 is used as a pattern of the mask data for the replacement. The mask data storage unit 334 may be provided by the client 4.

Acceptance of a rule information piece by the rule information selection acceptance unit 404 is not limited to acceptance of selection of a single rule information piece. The rule information selection acceptance unit 406 may accept selections of multiple rule information pieces. In the case of acceptance of the selection of multiple rule information pieces, the replacement unit 107 replaces identification information pieces included in the replaced document data with respective mask data pieces or partial text data pieces on the basis of the respective multiple rule information pieces. If even one rule for replacing the partial text data with the mask data is included in the rule information pieces, the partial text data is replaced with the mask data. Accordingly, partial text data to be masked can be freely selected according to the selection of the rule information piece.

A cancellation request acceptance unit 407 of the client 4 accepts a cancellation request which is a request for cancelling the application of a rule information piece, and sends the cancellation request to the server 3. A cancellation request receiver 308 of the server 3 receives the cancellation request. The replacement information transmitter 306 sends the client 4 replacement information extracted by using, as a data key, rule information pieces except for the rule information piece corresponding to the received cancellation request, identification information, replaced document data, and the mask data. Thereby, a re-replacement unit 409 of the client 4 replaces the identification information included in the replaced document data with the mask data or the partial text data, based on the newly received replacement information, the identification information, the replaced document data, and the mask data.

The identification information included in the replaced document data may be replaced with the mask data or the partial text data in the following manner. The client 4 receives and stores in advance a rule information piece, replacement information, identification information, replaced document data, and the mask data. When the cancellation request acceptance unit 407 of the client 4 accepts a cancellation request, the re-replacement unit 409 replaces the identification ID with mask data or partial text data on the basis of the replacement information, the identification information, the replaced document data, and the mask data stored in advance. Thereby, communication load can be reduced, and display response is enhanced.

Figure 17:
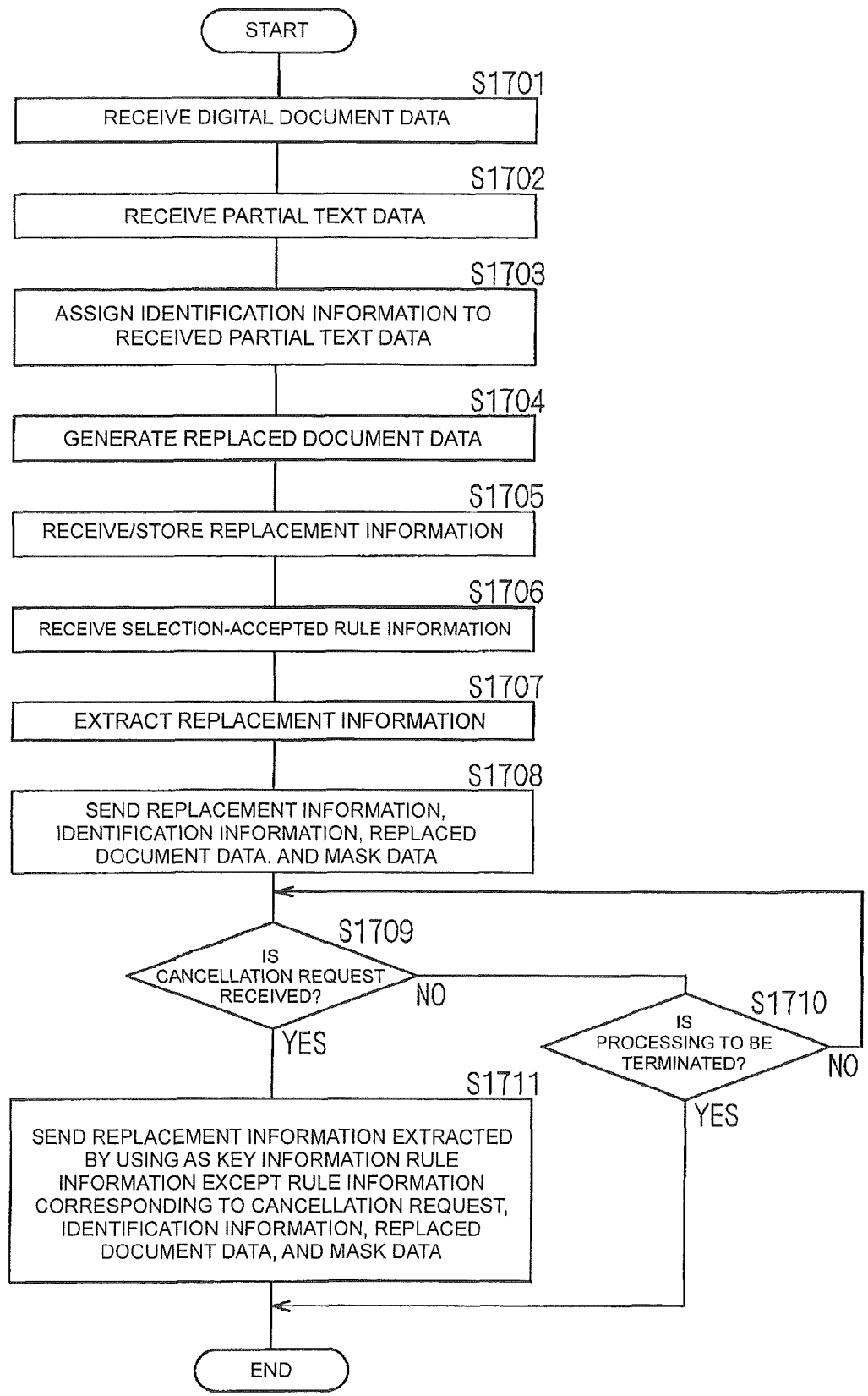
FIG. 17 depicts a process flow for showing the processing procedures of the CPU of a server of the digital document masking apparatus in an embodiment.

FIG. 17 depicts a process flow showing processing procedures of the CPU 31 of a server 3 of the digital document masking apparatus in an embodiment. At block S1701, the CPU 31 of the server 3 receives, as text data, digital document data on which masking is to be performed. At block S1702, designation-accepted partial text data is received.

At block S1703, the CPU 31 assigns unique identification information, which is, for example an identification ID, to the received partial text data, and stores the identification information in the identification information storage unit 331. The assignment of the identification information may be performed by the CPU 31 automatically or by the user.

At block S1704, the CPU 31 generates replaced document data in which partial text data in the received digital document data is replaced with assigned identification information and stores the generated replaced document data in the replaced document data storage unit 333 of the storage device 33. At block S1705, the CPU 31 receives and stores replacement information setting for those that have been accepted. At block S1706, the CPU 31 receives a selection-accepted rule information piece. At block S1707, the CPU 31 fetches the replacement information by using the received rule information piece as a data key. At block S1708, the CPU 31 sends the client 4 the extracted replacement information, the identification information, the replaced document data, and the mask data.

At block S1709, the CPU 31 determines whether or not a cancellation request, which is a request for cancelling application of a rule information piece, is received. If the CPU 31 determines that the cancellation request is not received then processing continues at block S1710 where the CPU 31 determines whether or not to terminate the processing. At block S1710, if the CPU 31 determines not to terminate the processing, then the CPU 31 returns the processing to block S1709 and enters a standby state for reception of the cancellation request. If at block S1710, the CPU 31 determines to terminate the processing, the CPU 31 terminates the processing.

Returning to block S1709, if the CPU 31 determines that the cancellation request is received, then at block S1711, the CPU 31 sends the client 4 replacement information extracted by using, as a data key, rule information pieces except the rule information piece corresponding to the received cancellation request, identification information, replaced document data, and the mask data. Thereby, the re-replacement unit 409 of the client 4 replaces the identification information included in the replaced document data with the mask data or the partial text data, on the basis of the newly received replacement information, the identification information, the replaced document data, and the mask data.

Figure 18:
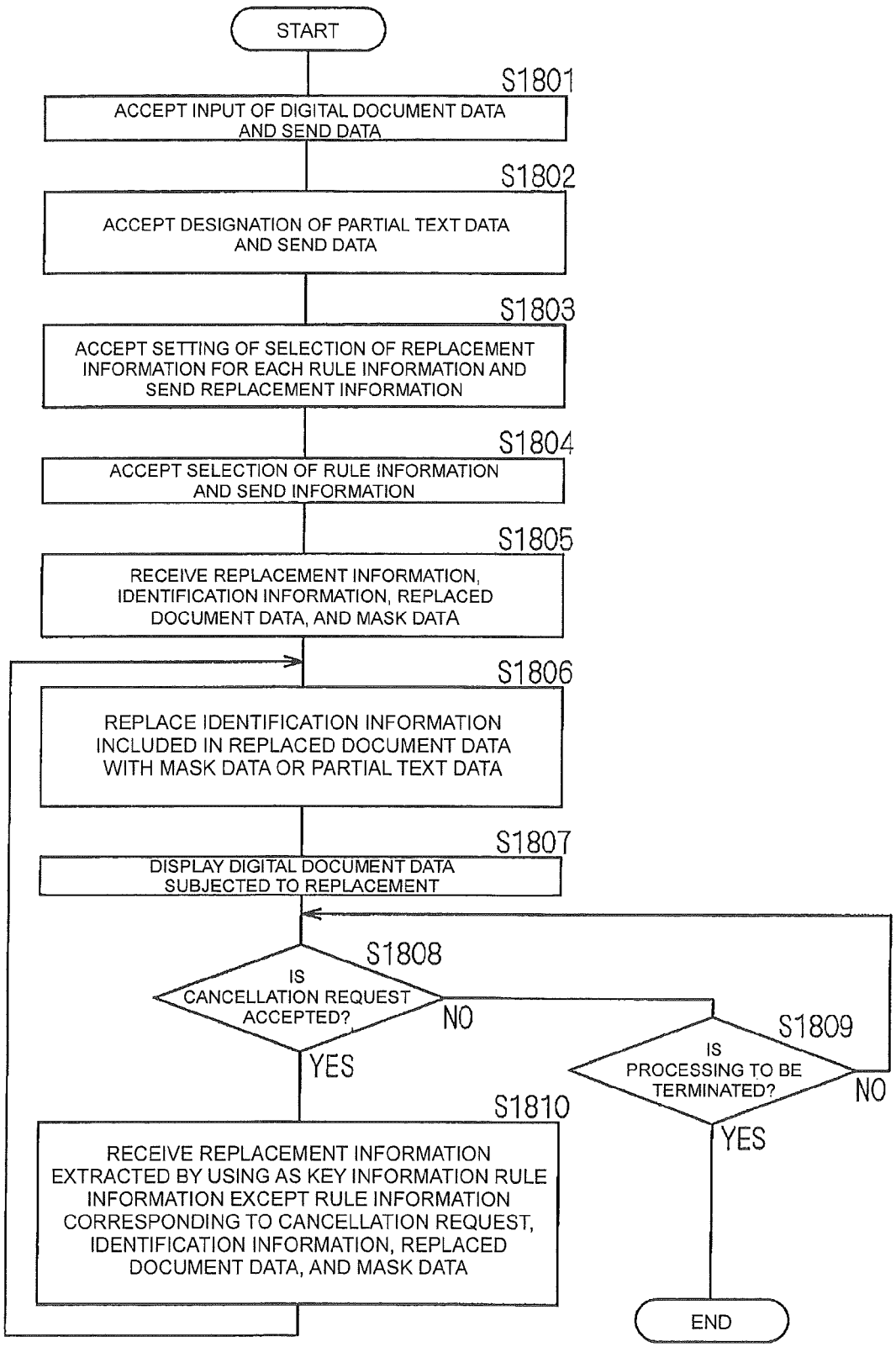
FIG. 18 depicts a process flow for processing procedures of the CPU of the client of the digital document masking apparatus in an embodiment.

FIG. 18 depicts a process flow for processing procedures of the CPU 41 of the client 4 of the digital document masking apparatus in an embodiment. At block S1801, the CPU 41 of the client 4 accepts input of digital document data on which masking is to be performed and sends the digital document data to the server 3. The input may be accepted using any method known in the art. The input of the digital document data may be directly accepted as text data or accepted as image data from which text data is extracted.

At block S1802, the CPU 41 accepts designation of partial text data to be replaced with the mask data in the digital document data of the accepted input and sends the partial text data to the server 3. The partial text data is a word based on a part of speech or having combined consecutive parts of speech, the word is obtained by executing a morphological analysis or the like on the digital document data which is text data.

At block S1803, the CPU 41 accepts, for each rule information piece indicating a rule for replacing designation-accepted partial text data with the mask data, setting of replacement information indicating whether or not to replace identification information with the mask data or partial text data. The client 4 sends the partial text data to the server 3. The rule information piece represents information on any rule for selecting partial text data to be masked, for example, a rule for masking a year only, a telephone number only or the like. The rule information piece is set in advance with the keyboard 54, the mouse 55, etc., or by the user, sent to the server 3, and stored in the storage device 33.

At block S1804, the CPU 41 accepts selection of a rule information piece and sends the rule information piece to the server 3. At block S1805, the CPU 41 receives the replacement information extracted by the replacement information storage unit 332 by using the sent rule information piece as a data key, the identification information, the replaced document data, and the mask data.

At block S1806, the CPU 41 replaces the identification information included in the replaced document data with the mask data or the partial text data, on the basis of the received replacement information, the identification information, the replaced document data, and the mask data. At block S1807, the CPU 41 displays the replaced digital document data on the display device 56.

At block S1808, the CPU 41 determines whether or not a cancellation request, which is a request for cancelling application of a rule information piece, is accepted. If the CPU 41 determines that the cancellation request is not accepted, then at block 1809, the CPU 41 determines whether or not to terminate the processing.

At block S1809, if the CPU 41 determines that the processing should not be terminated, the CPU 41 returns the processing to Step S1808 and enters a standby state for acceptance of the cancellation request. Otherwise, if the CPU 41 determines processing should be terminated, then the CPU 41 terminates the processing.

Returning to block S1808, if the CPU 41 determines that the cancellation request is accepted, then at block S1810, the CPU 41 sends the server 3 the accepted cancellation request and accepts the replacement information extracted by using, as a data key, rule information pieces except for the rule information piece corresponding to the received cancellation request, the identification information, the replaced document data, and the mask data. The CPU 41 returns the processing to Step S1806 to repeat the aforementioned processing.

According to the embodiment described above, based on a selection-accepted rule information piece, any desired partial text data included in digital document data may be replaced with mask data or restored to the original partial text data. In addition, the section to be replaced with the mask data may be controlled by selecting a rule information piece to be applied. Moreover, there is no restriction on the length of the partial text data to be masked with the mask data and on where it should be masked. In addition, even a difference in length between the partial text data and the mask data does not cause an unnatural spacing to occur.

Note that the present invention is not limited to the aforementioned embodiments, and various modifications, improvements, and the like can be made without departing from the spirit of the present invention. For example, inputs of replacement information, rule information, and the like may be accepted by the client 4, or directly accepted by the server 3. In addition, the replacement units 107 and 406 may be formed by the same hardware or individual hardware. The same holds true for the re-replacement units 109 and 409.

According to the present invention, any desired partial text data included in digital document data may be replaced with mask data based on selection-accepted rule information or can be restored to original partial text data, and where to be replaced with mask data can be controlled by selecting the rule information to be applied. Moreover, no particular restriction is imposed on the length of the partial text data to be replaced with the mask data and on where to be masked. In addition, even a difference in length between the partial text data and the mask data does not cause an unnatural spacing to occur.

The invention claimed is:

1. A method of displaying digital document data with partial text data therein replaced with mask data, the method comprising:
   acquiring, on a computer, digital document data;
   accepting, on the computer, a selection of an instance of partial text data to be replaced, the partial text data located within the digital document data;
   generating, on the computer, replacement document data that comprises a copy of the digital document data in which the instance of the partial text data is replaced with an identification information uniquely associated with said instance of the partial text data;
   storing, by the computer, a replaced document data, which comprises the replacement document data and an identification of a region of the replacement document data that includes the identification information corresponding to the instance of the partial text data, wherein the replacement document data comprises more than one region;
   accepting selection of one of a plurality of rule information pieces, which comprises a replacement information that associates the identification information with a mask pattern; and
   replacing, based on the replacement information, the identification information of the instance of the partial text data included in the replaced document data with the mask pattern.

2. The method according to claim 1, wherein two or more of the plurality of rule information pieces are selected.

3. The method according to claim 1, further comprising:
   accepting an application cancellation request for one of the plurality of rule information pieces; and
   replacing associated unique identification information included in the replaced document data with one of the mask data or the partial text data for all of the plurality of rule information pieces, except for the one of the plurality of rule information pieces that has been canceled, responsive to accepting the application cancellation request.

4. The method according to claim 1, further comprising storing an association between the instance of the partial text data and the identification information.

5. The method according to claim 1, further comprising storing, for each of the plurality of rule information pieces, the replacement information, the replacement information indicating whether or not to replace the associated unique identification information included in the replaced document data with the mask pattern, the plurality of rule information pieces indicating a rule for replacing the associated unique identification information.

6. An apparatus configured to display digital document data with partial text data therein replaced with mask data, the apparatus comprising:
   a processor; and
   a non-transitory computer readable storage medium comprising modules executable by the processor, wherein the non-transitory computer readable storage medium comprises:
      a data acquisition module configured to acquire the digital document data;
      a designation acceptance module configured to accept designation of an instance of the partial text data to be replaced, the partial text data located within the digital document data;
      a replaced document data generating module configured to generate replacement document data that comprises a copy of the digital document data in which the instance of the partial text data is replaced with an identification information corresponding to said instance of the partial text data;

a replaced document data storage unit configured to store a replaced document data, which comprises the replacement document data and an identification of a region of the replacement document data that includes the identification information corresponding to the instance of the partial text data, wherein the replacement document data comprises more than one region;

a selection acceptance module configured to accept selection of a rule information piece from a plurality of rule information pieces, which comprises a replacement information that associates the identification information with a mask pattern, the rule information piece corresponding to said instance of the partial text data; and a replacing module configured to replace, based on the replacement information, the identification information of the instance of the partial text data included in the replaced document data with the mask pattern.

7. The apparatus according to claim 6, wherein the selection acceptance module is further configured to accept selection of two or more of the plurality of rule information pieces, each corresponding to separate instances of the partial text data.

8. The apparatus according to claim 6, wherein the non-transitory computer readable storage medium further comprises:

a cancellation request acceptance module configured to accept an application cancellation request for one of the plurality of rule information pieces; and a re-replacing module configured to replace identification information included in the replaced document data with one of the mask data or the partial text data for all of the plurality of rule information pieces, except for the one of the plurality of rule information pieces that has been canceled, responsive to accepting the application cancellation request.

9. The apparatus according to claim 6, wherein the non-transitory computer readable storage medium further comprises an identification information storage module configured to store therein the partial text data of the designation in association with unique identification information.

10. The apparatus according to claim 6, wherein the non-transitory computer readable storage medium further comprises a replacement information storage module configured to store, for each of the plurality of rule information pieces indicating a rule for replacing the identification information, replacement information indicating whether or not to replace the identification information included in the generated replaced document data with the mask pattern, the plurality of rule information pieces indicating a rule for replacing the identification information.

11. A server configured to transmit digital document data with partial text data therein replaced with mask data to a client system, the server comprising:

a processor; and a non-transitory computer readable storage medium comprising modules executable by the processor, wherein the non-transitory computer readable storage medium comprises:

a partial text data receiver module configured to receive a selection of an instance of the partial text data designated as a subject of replacement in the digital document data;

a replaced document data generating module configured to generate replacement document data that comprises a copy of the digital document data in which the instance of the partial text data in the digital document data is replaced with a unique identifier corresponding to said instance of the partial text data;

a replaced document data storage unit configured to store a replaced document data, which comprises the replacement document data and an identification of a region of the replacement document data that includes the unique identifier corresponding to the instance of the partial text data, wherein the replacement document data comprises more than one region;

a rule information receiver module configured to receive a selection-accepted rule information piece that is representative of a replacement information for the unique identifier in the replaced document data, the replacement information associating the unique identifier with a mask pattern; and a replacement information transmitter module configured to send to a client computer the replaced document data and the replacement information, the replacement information extracted by using the rule information piece as a key.

12. The server according to claim 11, wherein the rule information receiver module further configured to receive a plurality of selection-accepted rule information pieces.

13. The server according to claim 12, comprising a cancellation request receiver module configured to receive an application cancellation request for one of the plurality of rule information pieces; and the replacement information transmitter module further configured to send the client computer the replaced document data and the replacement information extracted by using the key for each of the plurality of rule information pieces except the one of the plurality of rule information pieces that was received in the application cancelation request. information receiver module further configured to receive a plurality of selection-accepted rule information pieces.

14. The server according to claim 11 further comprising an identification information storage module configured to store therein the partial text data, and an association between instance of the partial text data associated with unique identification information.

15. The server according to claim 11 further comprising a replacement information storage module configured to receive and store, for each of a plurality of rule information pieces, replacement information indicating whether or not to replace the unique identifier included in the replaced document data with the mask pattern, the plurality of rule information pieces indicating a rule for replacing the unique identifier.

16. A computer program product executable by a server configured to replace partial text data included in digital document data with mask data, the computer program product comprising:

a tangible non-transitory storage medium readable by a processing circuit and storing instructions for execution by the processing circuit for performing a method comprising:

acquiring digital document data;

accepting a designation of an instance of the partial text data to be, the partial text data located within the digital document data;

generating replacement document data that comprises a copy of the digital document data in which the instance of the partial text data is replaced with an associated unique identification information;

storing a replaced document data, which comprises the replacement document data and an identification of a region of the replacement document data that includes the identification information corresponding to the instance of the partial text data, wherein the replacement document data comprises more than one region;

accepting selection of one of a plurality of rule information pieces, which comprises a replacement information that associates the identification information with a mask pattern; and replacing, based on the replacement information, the unique identification information included in the replaced document data with the mask pattern.

17. The computer program product according to claim 16, wherein two or more of the plurality of rule information pieces are selected.

18. The computer program product according to claim 16, wherein the method further comprises:

accepting an application cancellation request for one of the plurality of rule information pieces; and replacing associated unique identification information included in the replaced document data with one of the mask data or the partial text data for all of the plurality of rule information pieces, except for the one of the plurality of rule information pieces that has been canceled, responsive to accepting the application cancellation request.

19. The computer program product according to claim 16, wherein the method further comprises storing the partial text data of the designation of partial text data in association with unique identification information.

20. The computer program product according to claim 16, wherein the method further comprises storing, for each of the plurality of rule information pieces, the replacement information, the replacement information indicating whether or not to replace the unique identification information included in the replaced document data with the mask pattern, the plurality of rule information pieces indicating a rule for replacing the unique identification information.

\* \* \* \* \*